US007769514B2

(12) United States Patent
Pognant-Gros et al.

(10) Patent No.: US 7,769,514 B2
(45) Date of Patent: Aug. 3, 2010

(54) METHOD AND DEVICE FOR DAMPING CONTROL OF OSCILLATING MODES OF A CONTINUOUSLY VARIABLE TRANSMISSION PROVIDED WITH AN ELECTRIC VARIATOR

(75) Inventors: Philippe Pognant-Gros, Rueil Malmaison (FR); Laurent Royer, Paris (FR)

(73) Assignee: Renault S.A.S., Boulogne Billancourt (FR)

( * ) Notice: Subject to any disclaimer, the term of this patent is extended or adjusted under 35 U.S.C. 154(b) by 853 days.

(21) Appl. No.: 10/591,286

(22) PCT Filed: Feb. 25, 2005

(86) PCT No.: PCT/FR2005/050126

§ 371 (c)(1),
(2), (4) Date: Jan. 16, 2007

(87) PCT Pub. No.: WO2005/084986

PCT Pub. Date: Sep. 15, 2005

(65) Prior Publication Data
US 2007/0192008 A1    Aug. 16, 2007

(30) Foreign Application Priority Data
Mar. 5, 2004    (FR) .................................. 04 50453

(51) Int. Cl.
*G06F 17/00* (2006.01)
*F16H 3/72* (2006.01)

(52) U.S. Cl. .............................. 701/51; 701/58; 475/5; 477/3; 477/37; 180/65.25

(58) Field of Classification Search .................. 701/54, 701/111; 475/151
See application file for complete search history.

(56) References Cited

U.S. PATENT DOCUMENTS 5,866,809 A * 2/1999 Soderman ................ 73/114.15
6,343,252 B1    1/2002 Asami et al.

(Continued)

FOREIGN PATENT DOCUMENTS

FR    1 097 830    5/2001

(Continued)

OTHER PUBLICATIONS

Hoeijmakers, Martin J., Ferreire, Jan A., "The Electric Variable Transmission" IEEE Transactions on Industry Applications, vol. 42, No. 4, Jul./Aug. 2006, pp. 1092-1100.*

(Continued)

*Primary Examiner*—Thomas G Black
*Assistant Examiner*—Lin B Olsen
(74) *Attorney, Agent, or Firm*—Oblon, Spivak, McClelland, Maier & Neustadt, L.L.P.

(57) ABSTRACT

A method for damping control of oscillating modes of a continuously variable transmission which is provided with an electric variator by using a heat engine and at least two electric machines. In the method a torque controller of the electric machines is embodied in a form of a sum of a main instruction enabling to attain set torque on a wheel, heat engine torque, and an additional instruction for damping oscillating modes generated by stiffness of a kinematic chain between the heat engine and the wheels.

17 Claims, 4 Drawing Sheets

U.S. PATENT DOCUMENTS

| | | | |
|---|---|---|---|
| 6,354,974 B1 * | 3/2002 | Kozarekar | 475/5 |
| 6,441,506 B2 * | 8/2002 | Nakashima | 290/40 C |
| 7,292,917 B2 * | 11/2007 | Kuang et al. | 701/22 |
| 7,357,204 B2 * | 4/2008 | Hisada et al. | 180/65.285 |
| 2001/0020789 A1 | 9/2001 | Nakashima | |
| 2005/0137042 A1 * | 6/2005 | Schmidt et al. | 475/5 |
| 2005/0182545 A1 * | 8/2005 | Baumann et al. | 701/53 |
| 2005/0197234 A1 * | 9/2005 | Reuschel et al. | 477/41 |
| 2005/0205379 A1 * | 9/2005 | Tryon et al. | 192/70.17 |
| 2008/0000746 A1 * | 1/2008 | Schiele et al. | 192/3.54 |

FOREIGN PATENT DOCUMENTS

FR      2 823 281      10/2002

OTHER PUBLICATIONS

U.S. Appl. No. 11/722,617, filed Jun. 22, 2007, Pognant-Gros, et al.

* cited by examiner

METHOD AND DEVICE FOR DAMPING CONTROL OF OSCILLATING MODES OF A CONTINUOUSLY VARIABLE TRANSMISSION PROVIDED WITH AN ELECTRIC VARIATOR

BACKGROUND OF THE INVENTION

I. Field of the Invention

The present invention relates to the control of infinitely variable transmissions with electric variator.

More precisely, its subject is a method of damping the oscillating modes of an infinitely variable transmission with electric variator, comprising a heat engine and at least two electric machines, as well as a supervising device, affording regulation of the torque at the wheels and of the status of the heat engine.

This invention applies to a vehicle equipped with a heat engine and with an infinitely variable transmission with electric variator, which exhibits the particular feature of not comprising any coupler, clutch or converter, between the heat engine and the transmission.

It finds a favored, but nonlimiting application on a transmission device of the type comprising at least two parallel paths for power transmission, one path containing a kinematic chain with fixed gearing, and another path containing a continuous speed variator, composed of two electric machines.

II. Description of Related Art

The publication FR 2 823 281 discloses a device of the type indicated above, according to which the various paths are connected on the one hand to an input mechanical distributor linked to a mechanical energy source such as a heat engine, and on the other hand to an output mechanical distributor linked to the wheels of the vehicle. The input and output mechanical distributors, are preferably, but not necessarily, epicyclic gear trains.

The transmission described in this publication thus comprises two electric machines linked by an energy buffer element, which are integrated into a kinematic chain having four input and output shafts, respectively connected to the heat engine, to the wheels, and to the electric motors.

According to a customary arrangement within the field, a transmission calculation unit establishes instruction setpoints for each actuator (the two electric machines, and possibly the heat engine), making it possible to place the transmission on an operating point determined by other calculation modules called "higher monitoring layers", in the following four basic situations:

"torque tracking", where the driver presses the accelerator: the target of the computer is a wheel torque and a status of the heat engine required by the monitor (this is the commonest case where the heat engine provides an engine torque), "fuel cutoff", where the driver does not press the accelerator, and where injection is cut off to the heat engine and the latter provides a resistive torque; the target is a thermal status required by the monitor, "speed creeping", where the vehicle moves at low speed, the driver pressing neither the accelerator nor the brake; the target is a thermal status required by the monitor, and "torque creeping", where the vehicle moves at low speed, the driver pressing the brake pedal.

The calculation unit in charge of establishing the instruction setpoints of each actuator must in particular comply with the performance specifications, and must resist various disturbances, or "control noise" of the system, whilst affording regulation of the energy buffer element.

Among these disturbances are the oscillations caused by all the stiffnesses lying between the engine and the wheels. The better the performances, the more sensitive to these stiffnesses are the compliance and robustness of the regulating of the engine power plant.

Ignoring them restricts the performance of the regulating device, since excessive performance degrades the robustness, brings about oscillations, and leads to the instability of the regulating device.

BRIEF SUMMARY OF THE INVENTION

The aim of the present invention is to remove the oscillating effect of these stiffnesses, especially in the four situations indicated above, on the basis:

of the tracking of a wheel torque reference, of the tracking of a heat engine status reference, and of a damping of the oscillations brought about by the stiffnesses of the mechanical links (damping flywheel, differential, shafts, etc) between the heat engine, the transmission and the wheels.

With this aim, it proposes that the torque instruction of the electric machines be the sum of a main instruction making it possible to attain setpoints for wheel torque and torque of the heat engine, and of an instruction supplement intended to damp the oscillating modes brought about by the stiffnesses of the kinematic chain between the heat engine and the wheels.

In accordance with the invention, the instruction supplement depends on the setpoint signals and on estimates of physical quantities.

According to another characteristic of the invention, this instruction supplement is calculated by a unit for damping the oscillating modes.

It is added to an instruction setpoint for the electric machines, established by a unit for mechanical decoupling between the heat engine and the electric machines.

According to a preferred embodiment of the invention, the supervising device implemented comprises a mechanical supervising unit affording regulation of the torque at the wheels and status of the heat engine, which groups together a mechanical determination unit, a mechanical regulating unit, a mechanical decoupling unit, and a unit for damping the torsional modes.

BRIEF DESCRIPTION OF THE DRAWINGS

Other characteristics and advantages of the present invention will become clearly apparent on reading the following description of a nonlimiting embodiment thereof, referring to the appended drawings, in which.

DETAILED DESCRIPTION OF THE INVENTION

Figure 1:
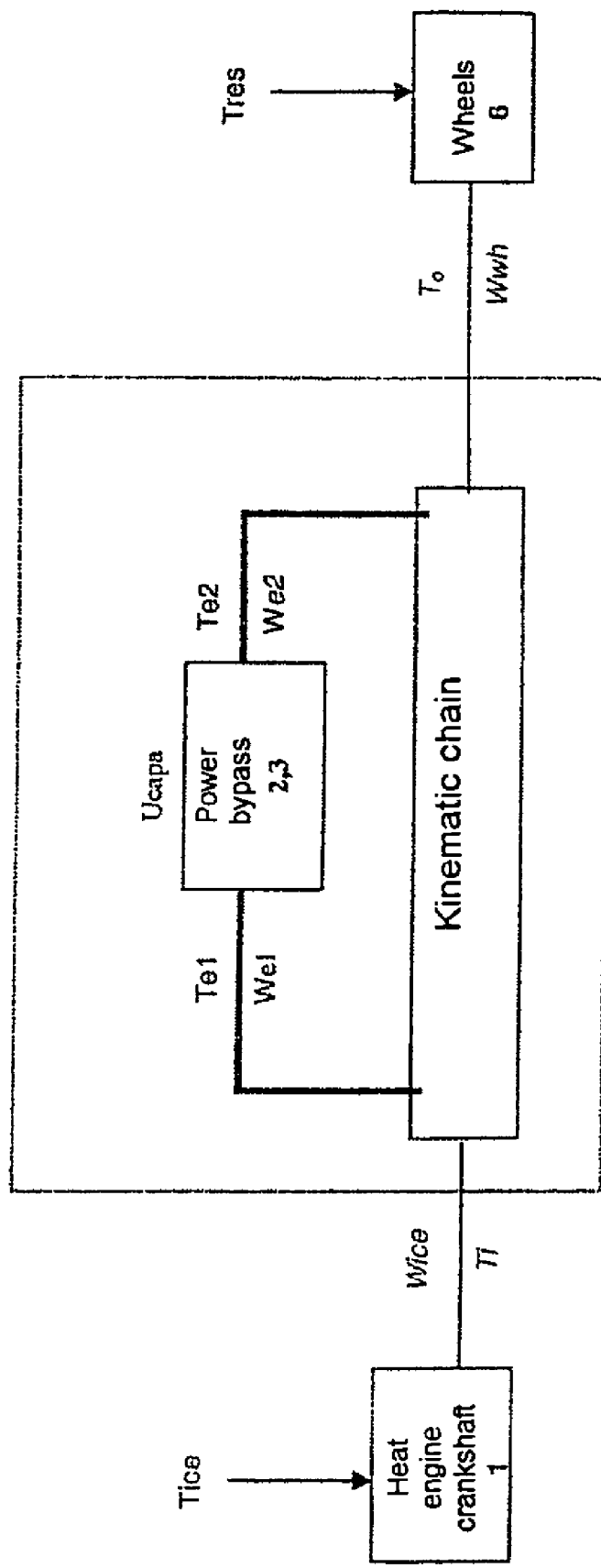
FIG. 1 is an infinitely variable transmission type diagram to which the invention applies.

Represented diagrammatically in FIG. 1 is an infinitely variable transmission with electric variator exhibiting two parallel paths for power transmission between the heat engine 1 and the wheels 6, such as is described in publication FR 2 823 281 to which reference may be made. The main power path comprises a kinematic chain with fixed gearing, and the so-called power bypass path includes the two electric machines 2, 3 constituting the variator. In the diagram, the physical quantities explained below have been mentioned: Tice, Ti, Wice, Te1, Te2, We1, We2, To, Wwh, and Tres.

The physical quantities characterizing the overall behavior of the EPP equipped with its infinitely variable transmission with electric variator that are mentioned in the diagrams are as follows.

Figure 2:
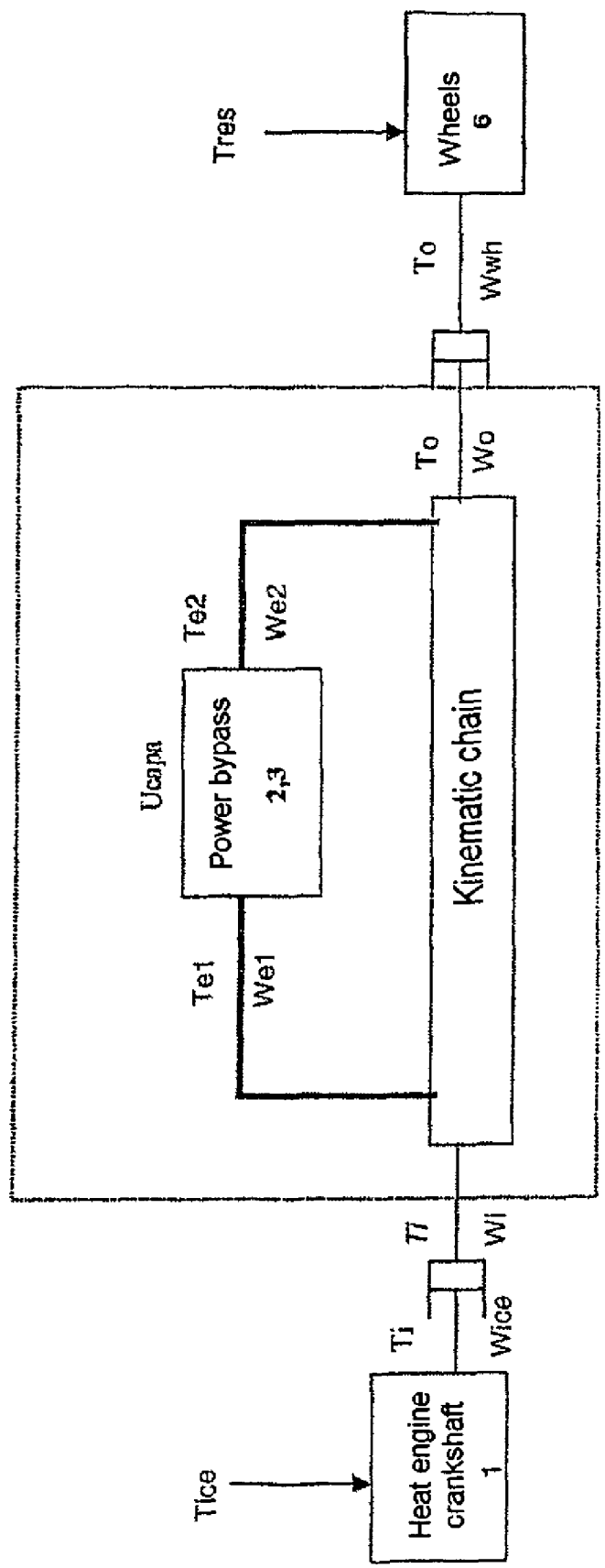
FIG. 2 depicts on this diagram the stiffnesses modeling taken into account.

At the level of the heat engine;
Tice: engine torque applied to the crankshaft,
Wice: engine status
At the level of the damping flywheel:
Ti: torque exchanged between the heat engine and the box,
Wi: status at the output of the flywheel,
At the level of the power bypass:
Te1: torque of the first electric machine 2
We1: status of the first electric machine 2
Te2: torque of the second electric machine 3
We2: status of the second electric machine 3
Ucapa: voltage across the terminals of the energy storage element:
At the level of the differential:
Wo: status at the output of the kinematic chain
To: wheel torque
At the level of the wheel:
Wwh: speed of the wheels
Tres: resistive torque As indicated in a nonlimiting manner in FIG. 2, the main stiffnesses of the engine power plant of FIG. 1 are assumed to be grouped together at the output of the heat engine and on the wheels. Specifically, these two stiffnesses appear explicitly in the model of the dynamic behavior of this engine power plant.

The transmission possibly being in one of the four situations cited (torque tracking, fuel cutoff, speed creeping, and torque creeping), the transmission supervising device comprises a mechanical supervising unit adapted to these four situations. More precisely, it must meet, in each of them, the mechanical objectives of the supervision, namely the regulating of the wheel torque To, and of the status of the heat engine Wice.

Figure 3:
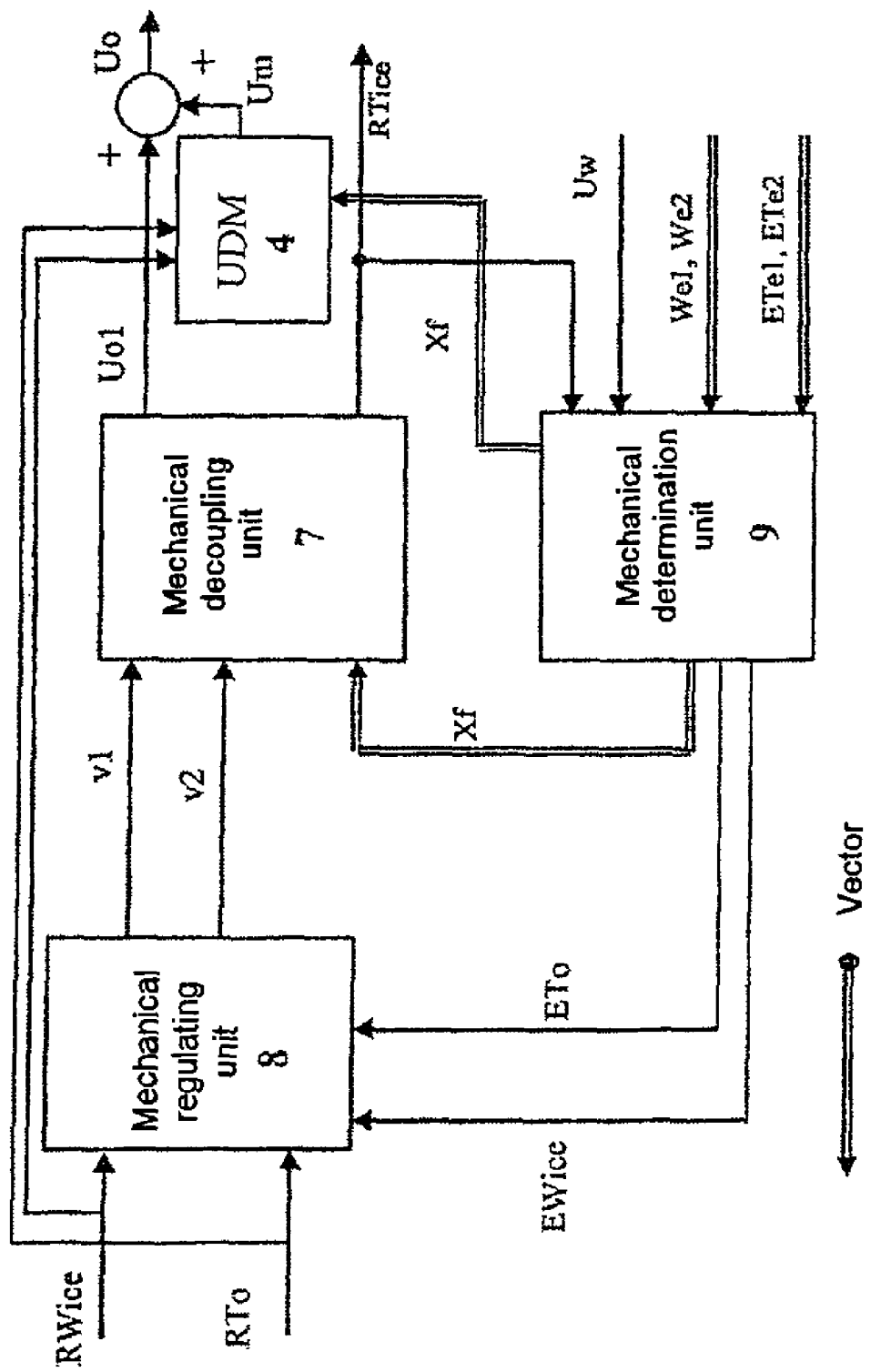
FIG. 3 shows the structure of the mechanical supervision implemented according to the invention.

The energy objective is moreover afforded by an energy supervising unit (not described), only the outgoing signals of which interacting with the mechanical supervision are mentioned:
Uw: energy instruction which is expressed as a function of Te1, Te2, We1 and We2,
ETe1: estimate of the torque of the first electric machine,
ETe2: estimate of the torque of the second electric machine, The mechanical supervising unit is itself composed of four units or modules grouped together in FIG. 3, with the various signals which are associated with them: a mechanical determination unit 9, a mechanical regulating unit 8, a mechanical decoupling unit 7, and a unit for damping the torsional modes 4.

The mechanical determination unit 9 has the function of providing the state of the system to the other mechanical supervising units. For this purpose, it utilizes the measurements of status We1, We2 of the electric machines 2, 3, as well as the energy instruction Uw, which is expressed as a function of the respective torques ETe1, ETe2, of these machines. The unit 9 also utilizes a signal RTice, emanating from the mechanical decoupling unit and which represents the engine torque setpoint sent to the computer of the heat engine.

On the basis of these measurements and signals, the mechanical determination unit calculates the following quantities:
EWice: estimate of the engine status,
ETo: estimate of the wheel torque,
EWe1 and EWe2: estimates of the statuses of the electric machines, and
a an estimation vector Xf, which comprises the above estimates, as well as ETi estimate of the torque Ti exchanged between the engine and the box, an estimate of the speed at the wheels EWwh, an estimate of the heat engine frictional torque Etdice, and an estimate of the frictional torque at the wheel ETres.

The vector Xf is therefore of the form:

Xf=[EWice, EWwh, Ewe1, Ewe2, ETi, ETo, ETdice, ETres]

This vector contains an estimate of the state of the transmission as a whole, in interaction with the heat engine and the wheels. This estimate is destined for the other units of the mechanical supervision. The calculation of these estimates as a whole is made possible by virtue of the known techniques for observing and estimating dynamic systems, and is based on a standard mathematical model of the dynamic behavior of the engine power plant.

The mechanical regulating unit calculates two intermediate control signals v1 and v2, on the basis of the engine status reference RWice, wheel torque reference RTo, engine status estimate EWice and wheel torque estimate (ETo):
the signal v1 is calculated by a regulator on the basis of the thermal status setpoint RWice and of the estimate of the thermal status EWice
the signal v2 is also calculated by a regulator on the basis of the wheel torque setpoint RTo and of the estimate of the wheel torque ETo.

The parameters of these two regulators are adjustment parameters for the mechanical regulating unit, which determine the degree of performance of the tracking of the setpoints RWice and RTo by the quantities Wice and To.

The mechanical decoupling unit 7 calculates an instruction Uo1 and a setpoint RTice for the heat engine torque on the basis of the intermediate instructions v1 and v2 of the estimation vector Xf emanating from the mechanical determination unit. This instruction ensures the tracking of the setpoints RWice and RTo, but cannot by itself deal with the damping of the oscillations brought about by the mechanical stiffnesses.

Finally, the unit for damping the torsional modes 4 (UAM), which calculates an instruction supplement Um which is added to Uo1: Um depends on the signals RWice, RTo and on the vector Xf. The instruction Uo1 is converted into electrical control torques Te1 and Te2.

As indicated above, one of the essential characteristics of the solution proposed relates to the unit for damping the torsional modes (UAM). This unit provides an instruction supplement Um, damping the oscillating modes brought about by the stiffnesses. This instruction gets added to the instruction Uo1 calculated by the mechanical decoupling unit, to obtain the final instruction Uo.

In accordance with the invention, the signal Um is the result of a linear combination of the elements of Xf, namely of estimates of physical quantities, and setpoint signals RWice and RTo.

Figure 4:
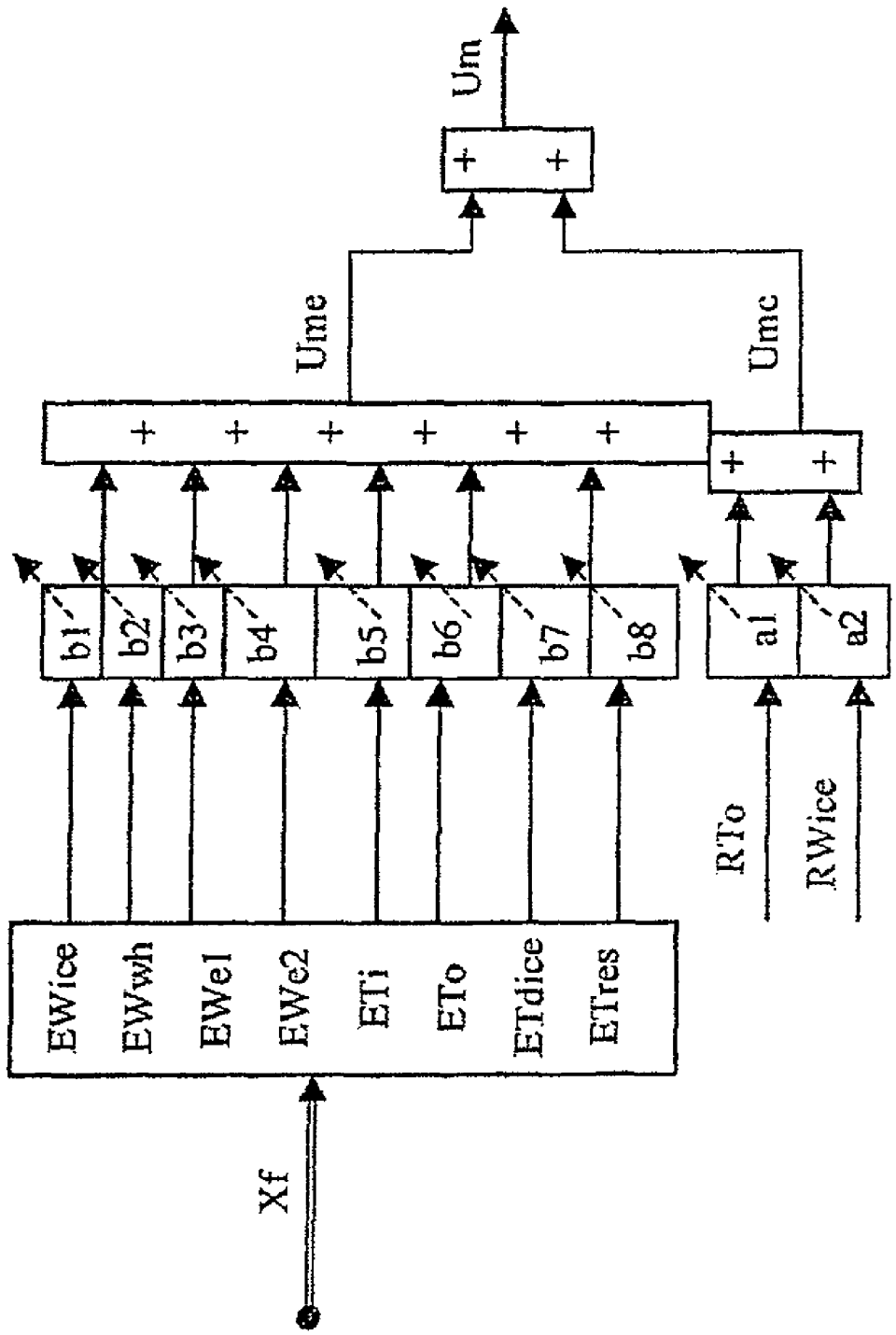
FIG. 4 is a diagram of the unit for damping the torsional modes.

FIG. 4 explains this calculation, and brings in various weighting parameters ai and bj. As indicated in this figure, the instruction Um has two components, Umc and Ume, such that Um=Umc+Ume:

Umc is a linear combination of the setpoints RWice and RTo:

$Umc = a1\ RWice + a2\ RTo$, and

Ume is a linear combination of the components of the vector Xf:

$Ume = b1\ EWice + b2\ EWwh + b3\ EWe1 + b4\ EWe2 + B5\ ETi + b6\ ETo + b7\ ETdice + b8\ ETres.$ The coefficients ai and bj are mapped as a function of the operating point of the vehicle. Their value can be calculated on the basis of various algorithms well known in the state of the art in automation (pole placement, energy optimization, robust control, etc.). They also constitute fine-tuning parameters for calibrating the unit for damping the oscillating modes.

The invention has numerous advantages. In each of the situations on the move: torque tracking, fuel cutoff, speed creeping and torque creeping, the solution proposed has the advantage of dealing with the oscillations brought about by the various mechanical stiffnesses. The instruction delivered by the unit for damping the torsional modes, Um gets added to the instruction Uo1 to give a final instruction Uo which makes it possible to act on the electric actuators to damp the oscillations.

Failure to deal with the stiffnesses leads in fact to mediocre benefit in the vehicle, as the mechanical regulating must ensure high performance in terms of the tracking of engine status setpoint, and of wheel torque.

The calculation of Um performed in the unit of damping the torsional modes, has the advantage finally of relating to estimates of physical quantities, this being of importance for fine-tuning.

The invention claimed is:

1. A method of damping oscillating modes of an infinitely variable transmission with electric variator, including a heat engine and at least two electric machines of a vehicle, comprising:
    calculating a main instruction to attain setpoints for wheel torque and torque of the heat engine;
    calculating an instruction supplement to damp the oscillating modes brought about by stiffnesses of a kinematic chain between the heat engine and wheels of the vehicle, the calculating the instruction supplement including adding weighted values of setpoints to weighted values of physical quantities, and the setpoints and the physical quantities are weighted according to a function of an operating point of the vehicle; and
    adding the instruction supplement to the main instruction to generate a final instruction.

2. The method of damping as claimed in claim 1, wherein the instruction supplement is composed of a first element which is a linear combination of the setpoints, and of a second element which is a linear combination of the physical quantities.

3. The method of damping as claimed in claim 2, wherein the second element includes an estimate of a status of the heat engine.

4. The method of damping as claimed in claim 2, wherein the second element includes an estimate of a speed of the wheels.

5. The method of damping as claimed in claim 2, wherein the second element includes an estimate of a status of the electric machines.

6. The method of damping as claimed in claim 2, wherein the second element includes an estimate of engine torque exchanged between the engine and a box.

7. The method of damping as claimed in claim 2, wherein the second element includes an estimate of torque at the wheels.

8. The method of damping as claimed in claim 2, wherein the second element includes an estimate of frictional torque of the heat engine.

9. The method of damping as claimed in claim 2, wherein the second element includes an estimate of frictional torque at the wheels.

10. The method of damping as claimed in claim 1, wherein each of the setpoints and the physical quantities are weighted with a different coefficient calculated based on the operating point of the vehicle.

11. A device for supervising a transmission of a vehicle to ensure regulation of torque at wheels and of thermal status of an infinitely variable transmission with electric variator, comprising:
    a heat engine;
    at least two electric machines;
    a mechanical decoupling unit positioned between the heat engine and the electric machines, and the mechanical decoupling unit calculates a main instruction to attain setpoints of the electric machines; and
    a damping unit for the torsional modes, which calculates an instruction supplement that is added to the main instruction, the instruction supplement damping oscillating modes brought about by stiffnesses of a kinematic chain between the heat engine and the wheels, and the damping unit for the torsional modes calculates the instruction supplement by adding weighted values of setpoints to weighted values of physical quantities, and the setpoints and the physical quantities are weighted according to a function of an operating point of the vehicle.

12. The supervising device as claimed in claim 11, wherein the mechanical decoupling unit receives two instructions calculated in a mechanical regulating unit based on setpoints and estimates of a status of the heat engine and of the torque at the wheels.

13. The supervising device as claimed in claim 12, further comprising a mechanical determination unit affording estimation of an engine status, and of the torque at the wheels.

14. The supervising device as claimed in claim 13, wherein the mechanical determination unit, the mechanical regulating unit, the mechanical decoupling unit, and the damping unit for the torsional modes, are grouped together in a mechanical supervising unit affording regulation of the torque at the wheels and status of the heat engine.

15. The supervising device as claimed in claim 13, wherein the mechanical determination unit establishes an estimation vector for the oscillating modes, which is intended for calculation of the instruction supplement.

16. The supervising device as claimed in claim 15, wherein the estimation vector for the oscillating modes is transmitted to the mechanical decoupling unit and to the damping unit for the torsional modes.

17. The supervising device as claimed in claim 11, wherein the damping unit for the torsional modes weights each of the setpoints and the physical quantities with a different coefficient calculated based on the operating point of the vehicle.

* * * * *